(12) United States Patent
Kitahara

(10) Patent No.: US 6,304,530 B1
(45) Date of Patent: Oct. 16, 2001

(54) OPTICAL DATA REPRODUCTION APPARATUS

(75) Inventor: Hiroshi Kitahara, Nagano (JP)

(73) Assignee: Kabushiki Kaisha Sankyo Seiki Seisakusho, Nagano (JP)

( * ) Notice: Subject to any disclaimer, the term of this patent is extended or adjusted under 35 U.S.C. 154(b) by 0 days.

(21) Appl. No.: 09/588,610

(22) Filed: Jun. 6, 2000

(30) Foreign Application Priority Data

Jun. 7, 1999 (JP) .................................................. 11-159797

(51) Int. Cl.⁷ ........................................................ G11B 7/00
(52) U.S. Cl. ...................................... 369/44.41; 369/44.11; 369/124.01
(58) Field of Search ............................ 369/44.11, 44.14, 369/44.27, 44.34, 44.41, 44.42, 124.01

(56) References Cited

U.S. PATENT DOCUMENTS 5,774,444 * 6/1998 Shimano et al. ............... 369/44.41 X
6,185,167 * 2/2001 Arai et al. ...................... 369/44.41 X

* cited by examiner

*Primary Examiner*—Muhammad Edun
(74) *Attorney, Agent, or Firm*—Sughrue, Mion, Zinn, Macpeak & Seas, PLLC

(57) ABSTRACT

A first pair of light-receiving cells and a second pair of light-receiving cells are diagonally arranged to constitute a quadrifid light-receiving cells. A pair of first wiring patterns are respectively connected to the first pair of light-receiving cells for leading out output signals therefrom. A pair of second wiring patterns are respectively connected to the second pair of light-receiving cells for leading out output signals therefrom. The first wiring patterns are arranged adjacent to each other, and the second wiring patterns are arranged adjacent to each other. A third wiring pattern is arranged between the first and second wiring patterns, in which a signal having a different nature from those of the output signals from the light-receiving cells.

13 Claims, 6 Drawing Sheets

OPTICAL DATA REPRODUCTION APPARATUS

BACKGROUND OF THE INVENTION

This invention relates to an optical data reproduction apparatus for optically reading data signals recorded onto recording media such as CDs and DVDs and more particularly to wiring patterns or terminal arrangement patterns connected to a light-receiving element.

Optical data reproduction apparatus have light-receiving elements for not only optically reading data signals recorded onto recording media but also detecting tracking and focusing errors. Some light-receiving element has light-receiving cells for detecting a tracking error with three beams, for example, in addition to a known quadrifid light-receiving cell, these light-receiving cells being disposed on one chip. The light-receiving element formed of one chip also has output terminals for leading the signals detected by the respective light-receiving cells to an external circuit, a power supply terminal for introducing a power supply to the light-receiving element, a ground terminal and any other proper terminal. An arrangement of these terminals is determined on the part of manufacturers of light-receiving elements. When the light-receiving element is incorporated into such an optical data reproduction apparatus, it has been attempted to make the order of wiring patterns on a flexible printed board for connection to the external circuit or the order of arranging pins of output connectors correspond to the arrangement of terminals of the light-receiving element.

FIG. 5 shows examples of wiring patterns in a related optical data reproduction apparatus. In FIG. 5, an optical pickup 40 as the optical data reproduction apparatus is connected to the front end IC 52 of a system board 50 via a wiring pattern 46 formed on a flexible printed board. The optical pickup 40 has a light-receiving element 42. The light-receiving element 42 has terminals of E, Vcc, Vc, GND and F in this order on one side and terminals of A, RF, B, C, D, F, E and GND in this order on the other. The light-receiving element 42 is packaged on a wiring board in the optical pickup 40 and connected to connectors for use in external connection via a wiring pattern 44 on the board. The wiring pattern 44 has a jumper line 45 and any other alternative pattern, whereby the connectors are arranged in the order of A, RF, B, C, D, F, E and GND.

A system board 50 also has connectors and a wiring pattern 48 extending from the connectors up to the front end IC 52. An arrangement of connectors on the side of the system board 50 is set conformable to that of connectors on the side of the optical pickup 40. The wiring pattern 46 such as the flexible printed board is used to electrically connect the connectors on the side of the optical pickup 40 and those on the side of the system board 50.

The terminals A, B, C and D of the light-receiving element 42 in the example shown in FIG. 5 are coupled to a quadrifid light receiving cell similar in shape to a quadrifid light-receiving cell 24 of FIG. 2. Output signals from these terminals are used to generate a phase-difference type tracking error signal. A look at the connectors and the wiring patterns shown in FIG. 5 reveals that B, C and D out of the signal lines from the quadrifid light-receiving cell are disposed side by side in this order. In other words, crosstalks are easily produced among the signal lines B, C and D; the drawback to the arrangement above is that a precise tracking error signal is hardly easy to obtain from such a phase-difference system.

A general description will now be given of the generation of a tracking error signal of the phase-difference system together with the reason for the difficulty of obtaining a precise tracking error signal because of crosstalks with reference to FIGS. 6 to 8.

In FIG. 6, reference numeral 54 denotes a quadrifid light-receiving cell. The light-receiving surface of the quadrifid light-receiving cell 54 is divided into four light-receiving cells a, b, c and d. The light-receiving cells a and d, and b and c are orientated in the direction of a track, T, which is equal to the x-axis direction, whereas the light-receiving cells a and b, and c and d are orientated in a direction perpendicular to the direction of the track, which is equal to the y-axis direction. The two light-receiving cells a and c are positioned diagonally, whereas the two light-receiving cells b and d are also positioned diagonally. Outputs of the two diagonal light-receiving cells a and c are added up by an adder 56 as a set so as to obtain an added signal 66. Outputs of the two diagonal light-receiving cells b and d are also added up by an adder 57 as a set so as to obtain an added signal 68.

The added signal 66 is subjected to waveform equalization in a waveform equalizer 58 and also waveform shaping in a waveform shaper 60 before being inputted to a phase comparator 62. Similarly, the added signal 68 is subjected to waveform equalization in a waveform equalizer 59 and also waveform shaping in a waveform shaper 61 before being inputted to the phase comparator 62. In the phase comparator 62, the phases of two sets of outputs thus supplied are compared, so that a pulse signal having width equal to the phase difference between the two sets of outputs. The pulse signal is integrated by a low-pass filter 64 and outputted as a tracking error signal.

The principle of detection by the tracking error detector in the phase difference system will now be described. FIG. 7 refers to a case where a beam spot 70 is moving above the center of the track TC. While the beam spot 70 is related to the pit 72 of a recording medium as shown in FIG. 7A, the dark areas 74 and 76 produced from the light diffraction by the pit 72 within a far field are produced in areas equal to the four light-receiving cells a, b, c and d as shown in FIG. 7B. Therefore, as shown in FIG. 7C, output signal waveforms of the light-receiving cells a, b, c and d are equalized and so are output waveform 66 of the adder 56 and the output waveform 68 of the adder 57 as shown in FIG. 7D. In this state, the phase difference $\Delta t$ becomes zero. Here, the variable t is defined by $x/v$ (x: displacement of the beam spot in the track direction T; v: velocity of the beam spot in the track direction T).

Further, FIG. 8A refers to a case where the center of the beam spot SC on the recording medium has been displaced by $\Delta y$ in the y-axis direction from the center of the track TC. While the beam spot 70 is related to the pit 72 as shown in FIG. 8A, the dark areas 74 and 76 within the far field appear as shown in FIG. 8B and there is produced differences in the dark areas produced in the four light-receiving cells a, b, c and d, whereby a phase difference of $\Delta t1$ is produced between the output signals of the light-receiving cells a and c and the output signals of the receiving cells b and d, and between the added signals of (a+c) and the added signals of (b+d) as shown in FIGS. 8C and 8D. Consequently, a pulse signal having a pulse width of $\Delta t1$ is produced from the phase comparator 62. This pulse signal is integrated by the low-pass filter 64 to become an output value corresponding to the amount of displacement $\Delta y$, so that tracking control is performed according to the output value.

In accordance with the tracking error detection of the phase difference system as set forth above, in the case of CD-ROM and DVD-ROM drives at from single speed to double speed, for example, output signal frequencies of the light-receiving cells a, b, c and d become considerably high, namely, ranging from 4.5 MHz to 50 several MHz. Consequently, in a case where terminals and wiring patterns B, C and D for passing signals different in phase therethrough are set adjacent to one another as in the related optical data reproduction apparatus shown in FIG. 5, the signal is allowed to leak out of one adjoining wiring pattern and superposed on the signal in the other wiring pattern. Then a so-called crosstalk will occur, thus causing the two signals to mutually damage each other. The action like this will then result in making it difficult to obtain a precise tracking signal. This problem tends to become apparent as the driving speed of the recording medium increases. In the related example of FIG. 5, about 8-times speed is a limit and speed exceeding this limit makes the signal-line-to-signal-line crosstalk conspicuous and also makes a precise tracking error signal unavailable.

Incidentally, the difference between the sum of signals A and C and that of signals B and D, that is, (A+C)−(B+D) has been well known to be usable as a focus error signal. The focus error signal is such that the (A+C) signal and the (B+D) signal are fed into the +input terminal and −input terminal of an operational amplifier, whereby not a phase difference but a difference in level therebetween is outputted as a focusing error signal. As the frequency area of the focusing error signal ranges from 10 to 20 kHz, the focusing error signal is obviously different in the frequency area from the tracking error signal of the phase difference system.

SUMMARY OF THE INVENTION

An object of the present invention made to solve the foregoing problems pertaining to the related art is to provide an optical data reproduction apparatus capable of suppressing a signal-line-to-signal-line crosstalk even at 8-times speed to ensure that a precise tracking error signal is obtainable even at high-speed reproduction time.

The optical data reproduction apparatus according to the invention has the light-receiving element including the quadrifid light-receiving cell and used for obtaining a tracking error signal by adding up outputs of two cells positioned diagonally in the quadrifid light-receiving cell with the two diagonal cells of the quadrifid light-receiving cell as one set so as to obtain the outputs of two sets of cells, and comparing the phases of the outputs of the two sets of cells, wherein outputs of the quadrifid light-receiving cell are obtained via wiring patterns connected to the respective cells of the quadrifid light-receiving cell; two wiring patterns are connected to one set of diagonal cells, and two wiring patterns are connected to the other one set of diagonal cells; and a wiring pattern for passing therethrough a signal different in nature from the output of the quadrifid light-receiving cell is disposed between two sets of wiring patterns connected to the respective different sets of cells. Accordingly, a tracking error signal without considerable error is made available by suppressing the crosstalk.

As the wiring pattern for passing therethrough the signal different in nature from the output of the quadrifid light-receiving cell can be one of a wiring pattern having a low impedance such as a power supply line and a ground line, a wiring pattern for passing therethrough a signal different in a frequency band, and a wiring pattern connected to a light-receiving cell different from the quadrifid light-receiving cell, the wiring patterns respectively connected to one set of diagonal cells are shut off the other one set of diagonal cells. Accordingly, a tracking error signal without considerable error is made available by suppressing the crosstalk.

As the light-receiving element having the quadrifid light-receiving cell has the connector terminal electrically connected to each light-receiving cell and also to the circuit wiring board, the two terminals connected to one set of diagonal cells and other two terminals connected to the other one set of diagonal cells are provided. Further, the terminal for passing therethrough the signal different in nature from the output of the quadrifid light-receiving cell is disposed between one set of terminals and the other one set of terminals connected to the respective difference sets of cells. As in-phase signals are passed through the terminals respectively connected to one set of diagonal cells and the other one set of diagonal cells, whereby no crosstalk is produced even though these sets of terminals are set adjacent to each other. Moreover, the terminal for passing therethrough the signal different in nature from the output of the quadrifid light-receiving cell is disposed between one set of diagonal cells and the other one set of diagonal cells whereby to shut the one set of terminals off the other one set thereof. Accordingly, a tracking error signal without considerable error is made available by suppressing the crosstalk.

BRIEF DESCRIPTION OF THE DRAWINGS

In the accompanying drawings:

FIG. 7A is a plan view showing the relation between a beam spot and a pit; FIG. 7B is a plan view showing the relation between an optical detector and a far field image; FIG. 7C is a waveform chart showing output of each light-receiving cell; and FIG. 7D is a waveform chart showing output of each adder; FIG. 8A is a plan view showing the relation between the beam spot and the pit; FIG. 88 is a plan view showing the relation between the optical detector and the edge field image; FIG. 8C is a waveform chart showing output of each light-receiving cell; and FIG. 8D is a waveform chart showing output of the adder.

DETAILED DESCRIPTION OF THE PREFERRED EMBODIMENTS

An optical data reproduction apparatus according to one embodiment of the present invention will now be described with reference to FIGS. 1 to 4.

Figure 1:
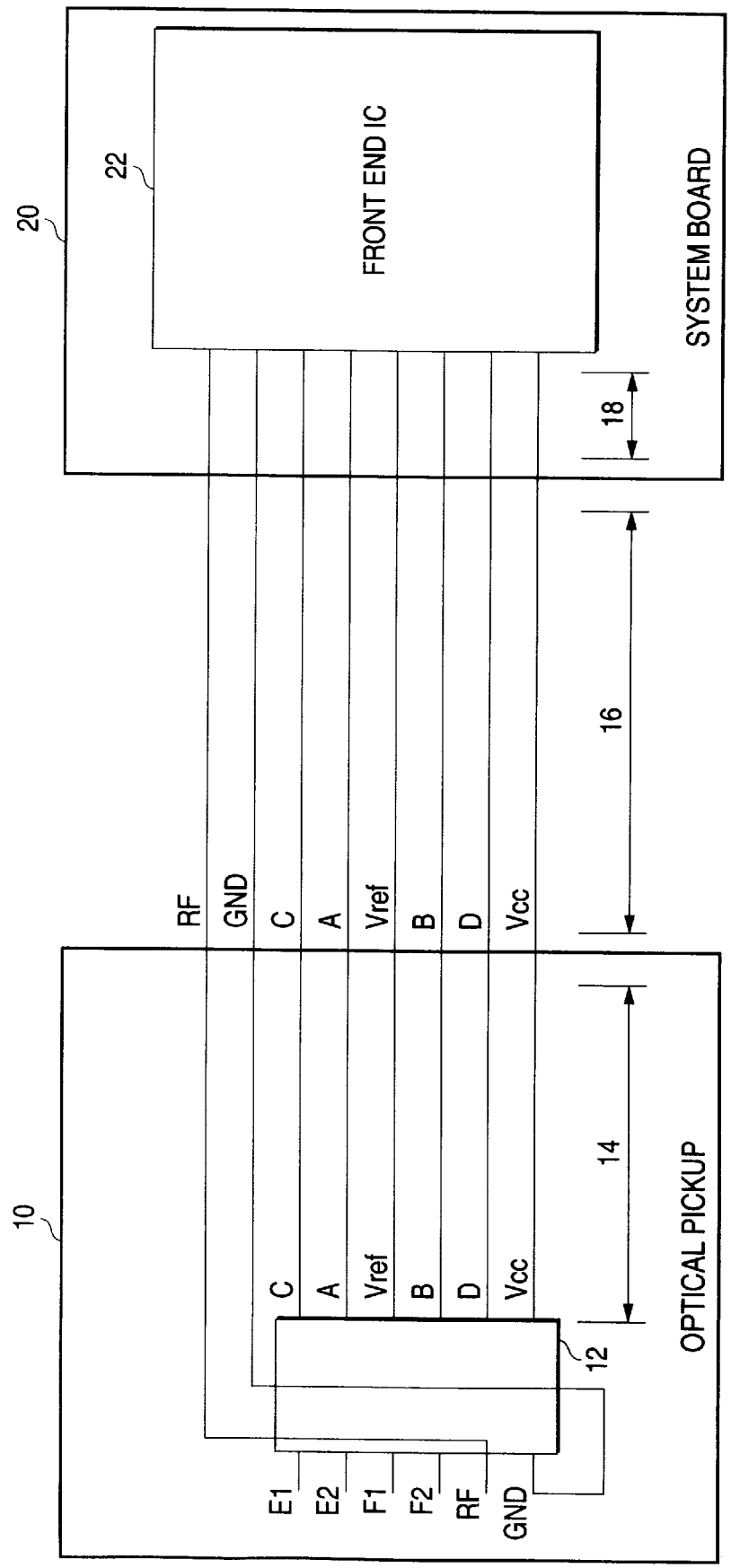
FIG. 1 is a wiring diagram illustrating an optical data reproduction apparatus according to one embodiment of the invention.

As shown in FIG. 1, an optical pickup 10 is connected to the front end IC 22 of a system board 20 via a wiring pattern 16 provided on a flexible printed board. The optical pickup 10 also has a light-receiving element 12. The light-receiving element 12 has terminals E1, E2, F1, F2, RF and GND in this order on one end and terminals C, A, Vref, B, D and Vcc in this order on the other. The light-receiving element 12 is packaged on a wiring board in the optical pickup 10 and connected to connectors on the side of the optical pickup 10 via a wiring pattern 14 on the wiring pattern. The connectors in the wiring pattern 14 are disposed in the above order on the side of the optical pickup 10.

Figure 6:
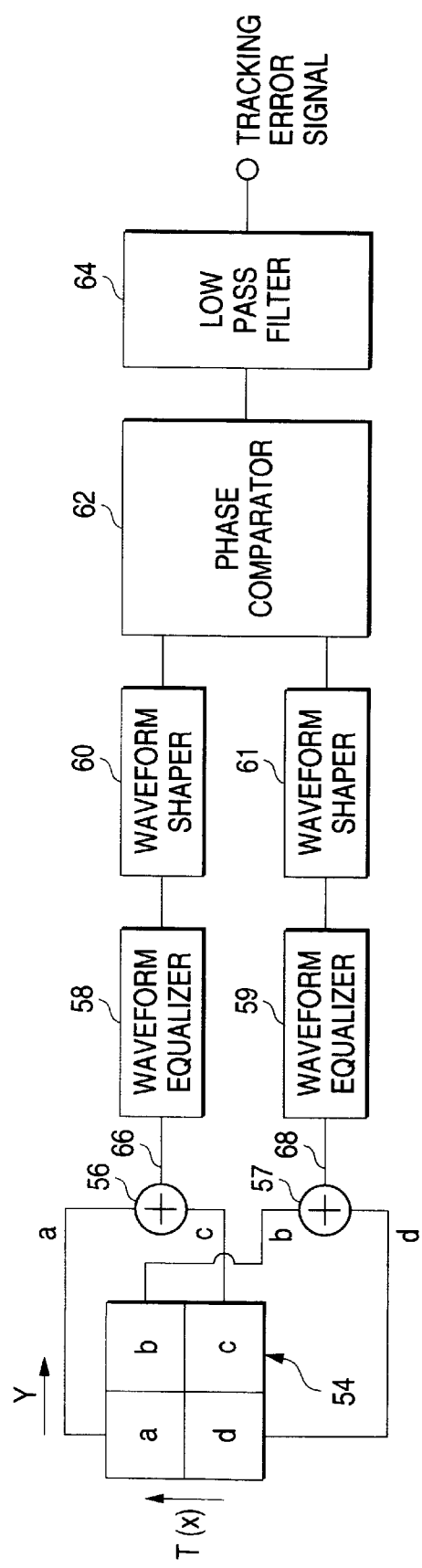
FIG. 6 is a block diagram illustrating a tracking error detector for use in the related optical data reproduction apparatus.
Figure 7A:
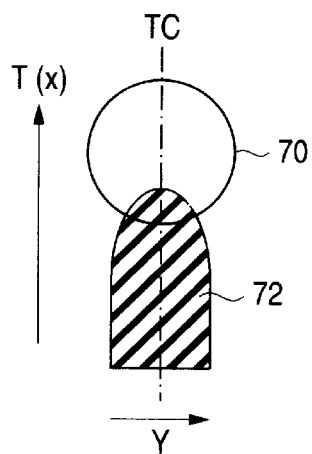
FIGS. 7A–7D are diagrams illustrating the principle of detecting a tracking error in the related optical data reproduction apparatus without any tracking error.
Figure 7B:
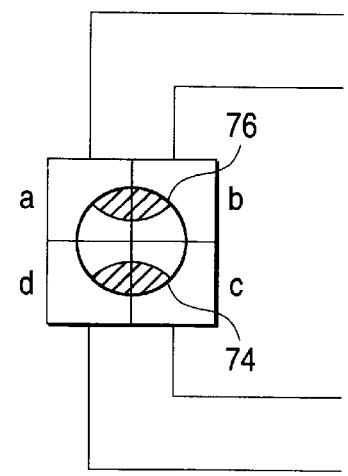
Figure 7C:
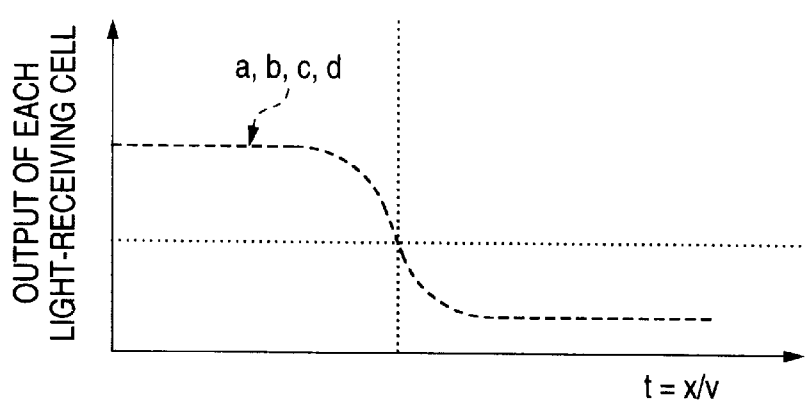
Figure 7D:
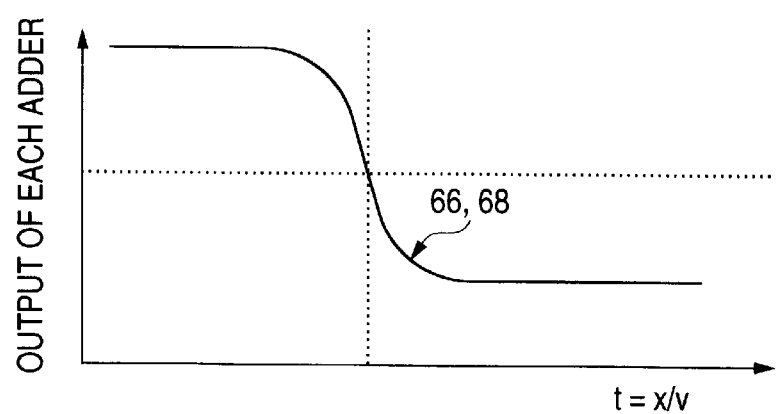
Figure 8A:
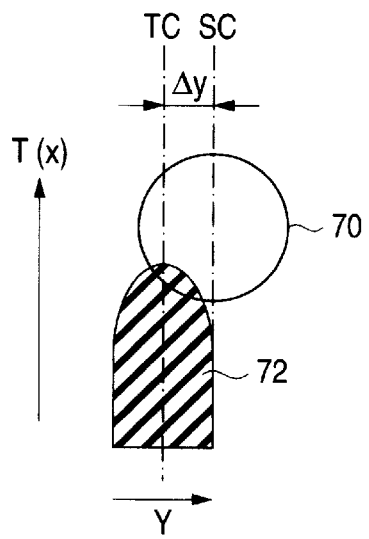
FIGS. 8A–8D are diagrams illustrating the principle of detecting the tracking error in the related optical data reproduction apparatus with the tracking error.
Figure 8B:
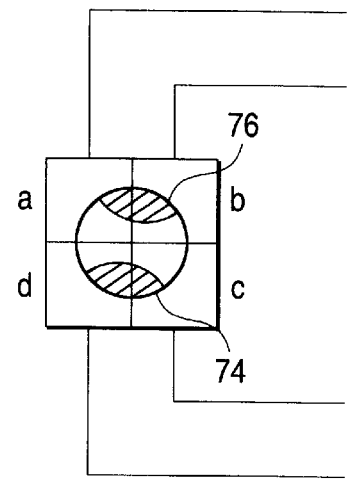
Figure 8C:
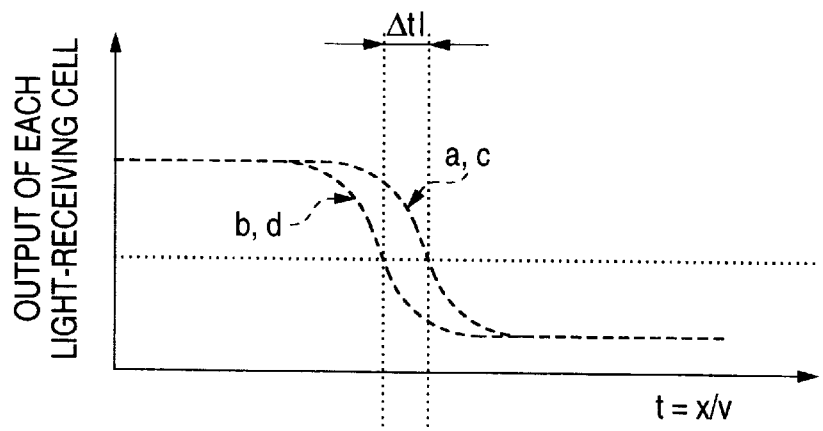
Figure 8D:
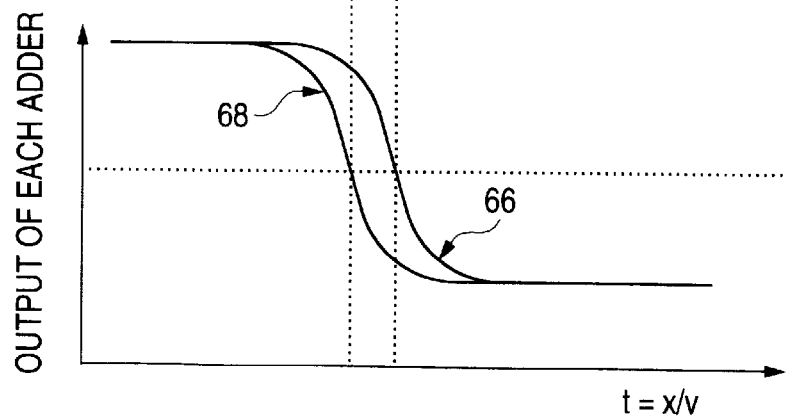

The system board 20 also has connectors and a wiring pattern 18 extending from the connectors up to a front end IC 22. An arrangement of connectors on the side of the system board 20 is set conformable to that of connectors on the side of the optical pickup 10. The wiring pattern 16 such as the flexible printed board is used to electrically connect the connectors on the side of the optical pickup 10 and those on the side of the system board 20. The system board 20 forms the control board of the optical data reproduction apparatus and has adders, waveform equalizers, waveform shapers, a phase comparator and the like as illustrated in FIG. 6.

Figure 2:
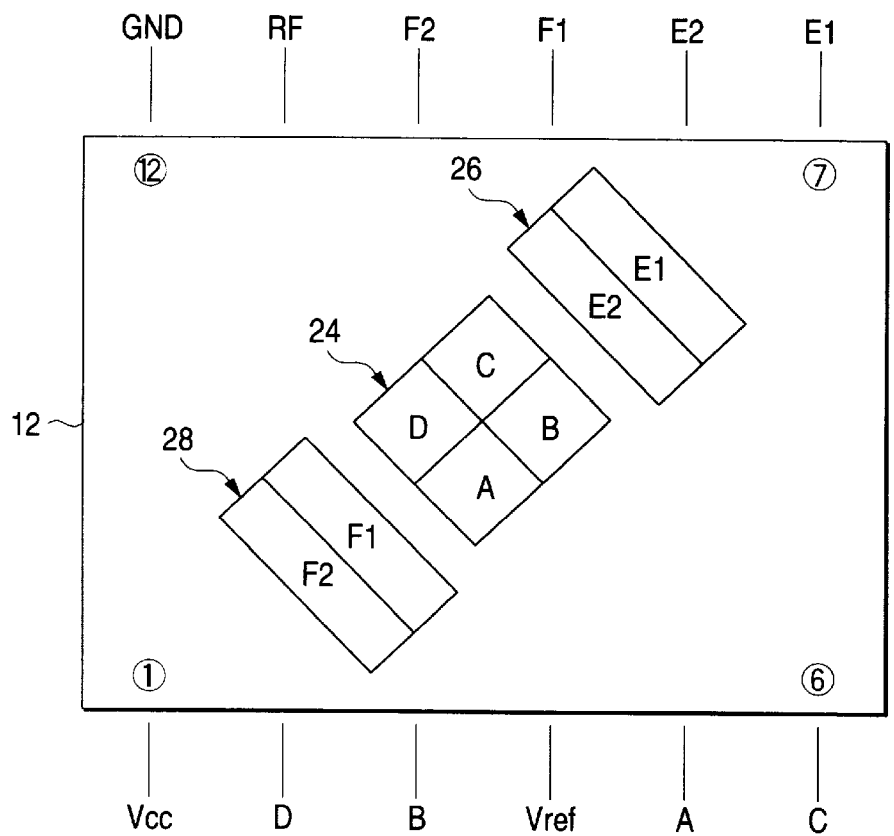
FIG. 2 is a plan view showing a part of a light-receiving element according to the embodiment of the invention.

FIG. 2 is a diagram illustrating the light-receiving element 12 in detail.

As shown in FIG. 2, the light-receiving element 12 has a central quadrifid light-receiving cell 24 including four cells A, B. C and D, a sideward light-receiving cell 26 having two cells E1 and E2 and another sideward light-receiving cell 28 having two cells F1 and F2 on both sides of the light-receiving cell 24. Of the terminals disposed on one side of the light-receiving element 12, E1, E2, F1 and F2 are connected to the cells E1 and E2, and F1 and F2 of the sideward light-receiving cells 26 and 28, respectively. The embodiment of the invention shown in FIG. 1 refers to a case where E1, E2, F1 and F2 are not employed. RF designates a signal for reading the data signal recorded in a recording medium and is obtainable by combining the outputs of the four cells A, B, C and D of the quadrifid light-receiving cell in the light-receiving element 12, GND being a ground connection.

Of the terminals disposed on the other side of the light-receiving element 12, C, A, B and D are connected to the corresponding cells C, A, B and D of the quadrifid light-receiving cell 24. The arrangement relations among the four light-receiving cells A, B, C and D are substantially similar to those among the light-receiving cells a, b, c and d in the related example with reference to FIG. 6.

Consequently, the two light-receiving cell A and C are positioned diagonally and so are the other two light-receiving cells B and D. The outputs of the two diagonal light-receiving cells A and C are added up by an adder so as to obtain an added signal as shown in FIG. 6. The outputs of the other two diagonal light-receiving cells B and D are also added up by another adder so as to obtain an added signal. These added signals are subjected to waveform equalization, waveform shaping and the like. Further, the phases of these two processed signals are compared whereby to obtain a tracking error signal. In FIGS. 1 and 2, Vref and Vcc represent a constant reference voltage and a power supply, respectively.

As is obvious from FIGS. 1 and 2, out of the terminals A, B, C and D linked to the respective cells A, B. C and D of the quadrifid light-receiving cell, the two terminals A and C connected to one set of diagonal cells A and C are set adjacent to each other and the other two terminals B and D connected to one set of diagonal cells B and D are also set adjacent to each other. Moreover, a terminal for passing therethrough a signal different in nature from the output of the quadrifid light-receiving cell 24 is arranged between the two sets of terminals respectively connected to the different sets of cells. More specifically, the terminal Vref for the signal different in nature from the output of the quadrifid light-receiving cell 24 and what has a low impedance is provided between one set of terminals A and C and the other set of terminals B and D.

With respect to the terminals of the connector, GND having a low impedance is held between one set of terminals A and C, and the terminal RF so as to shut an RF signal off the output signals of the light-receiving cells A and C. Therefore, no crosstalk is produced between the RF signal and the output signals of the light-receiving cells A and C.

With the arrangement above, the signals passed through one set of adjoining terminals A and C are in phase with each other as illustrated in FIG. 8, so that no problem is raised by the crosstalk therebetween. Similarly, the signals passed through the other one set of adjoining terminals B and D are in phase with each other, so that no problem is raised by the crosstalk therebetween. On the other hand, the signals passed through the terminals A and C are out of phase with the signals passed through the terminals B and D and since the signals having a high frequency are passed therethrough as stated previously, there develops a crosstalk problem in a case where the signals are adjacent to one another. On this point, the terminal Vref having a low impedance is provided between one set of terminals A and C and the other one set of terminals B and D in the example shown in FIGS. 1 and 2 and this acts as what shuts off the crosstalk between one set of terminals A and C and the other one set of terminals B and D. Thus, a tracking error signal can be detected without considerable error.

In order to deal with the arrangement of terminals of the light-receiving element 12, the wiring pattern 14 in the optical pickup 10, the wiring pattern 18 of the flexible printed board, and the wiring pattern 18 on the side of system board 20 are set to correspond to the arrangement of terminals thereof. Consequently, wiring patterns A and C for passing therethrough in-phase signals are set adjacent to each other and wiring patterns B and D for passing there-through in-phase signals are also set adjacent to each other even in the wiring pattern 16 of a connection cable. Moreover, a wiring pattern to which Vref having a low impedance is applied exists between one set of wiring patterns A and C and another set of wiring patterns B and D and this acts as what shuts off the crosstalk between one set of wiring patterns A and C and the other one set of wiring patterns B and D. Thus, a tracking error signal can be detected without considerable error.

Figure 3:
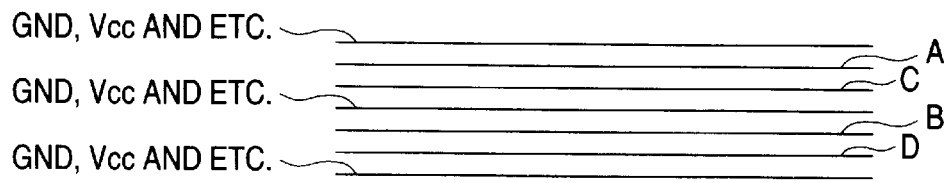
FIG. 3 is a wiring diagram illustrating another exemplary wiring pattern applicable to the invention.

In this case, it is only necessary that a terminal or a wiring pattern to be placed between one set of terminals or wiring patterns A and C and the other one set of terminals or wiring patterns B and D should be a terminal or a wiring pattern for passing therethrough a signal different in nature from the output of the quadrifid light-receiving cell 24. The Vref may be replaced with a power supply Vcc, GND or the like through which a signal having a low impedance passes or a signal in a frequency band entirely different from the frequency band of the signal outputted from the quadrifid light-receiving cell 24 passes. As shown in FIG. 3, for example, a wiring pattern to be connected to a ground line or a power supply line may be arranged between one set of wiring patterns A and C and the other one set of wiring patterns B and D.

The light-receiving element 12 shown in FIG. 2 is designed as a light-receiving element for simultaneously use in CD and DVD and has the light-receiving cells 26 and 28 in addition to the quadrifid light-receiving cell 24. These three light-receiving cells makes obtainable a tracking error signal in the three beam system and may also be employed for any other use. As the signals detected from the light-receiving cells 26 and 28 are those in a low frequency band which is entirely different from the frequency band of the output signal of the quadrifid light-receiving cell 24, a terminal or a wiring pattern for passing therethrough the signals detected from the light-receiving cells 26 and 28 may be disposed between one set of terminals or wiring patterns A and C and the other one set of terminals or wiring patterns B and D. With this arrangement, the crosstalk between one set of terminals or wiring patterns A and C and the other one set of terminals or wiring patterns B and D can also be suppressed.

In the above embodiment of the invention, there has been described a case where the two wiring patterns for passing therethrough in-phase signals are set adjacent to each other. However, as a terminal or wiring pattern different from the frequency band of the signal outputted from the quadrifid light-receiving cell 24 is only needed to be provided between one set of terminals or wiring patterns A and C and another set of terminals or wiring patterns B and D in order to suppress the crosstalk between one set of terminals or wiring patterns A and C and the other one set of terminals or wiring patterns B and D, it is unnecessary to set one set of terminals or wiring patterns A and C or terminals or wiring patterns B and D adjacent to each other. In other words, another terminal or wiring pattern may be provided between A and C or B and D.

Figure 4:
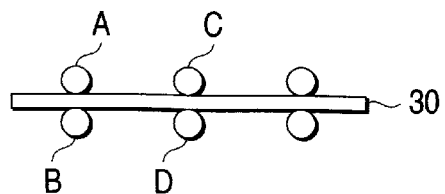
FIG. 4 is a sectional view of still another exemplary wiring pattern applicable to the invention.
Figure 5:
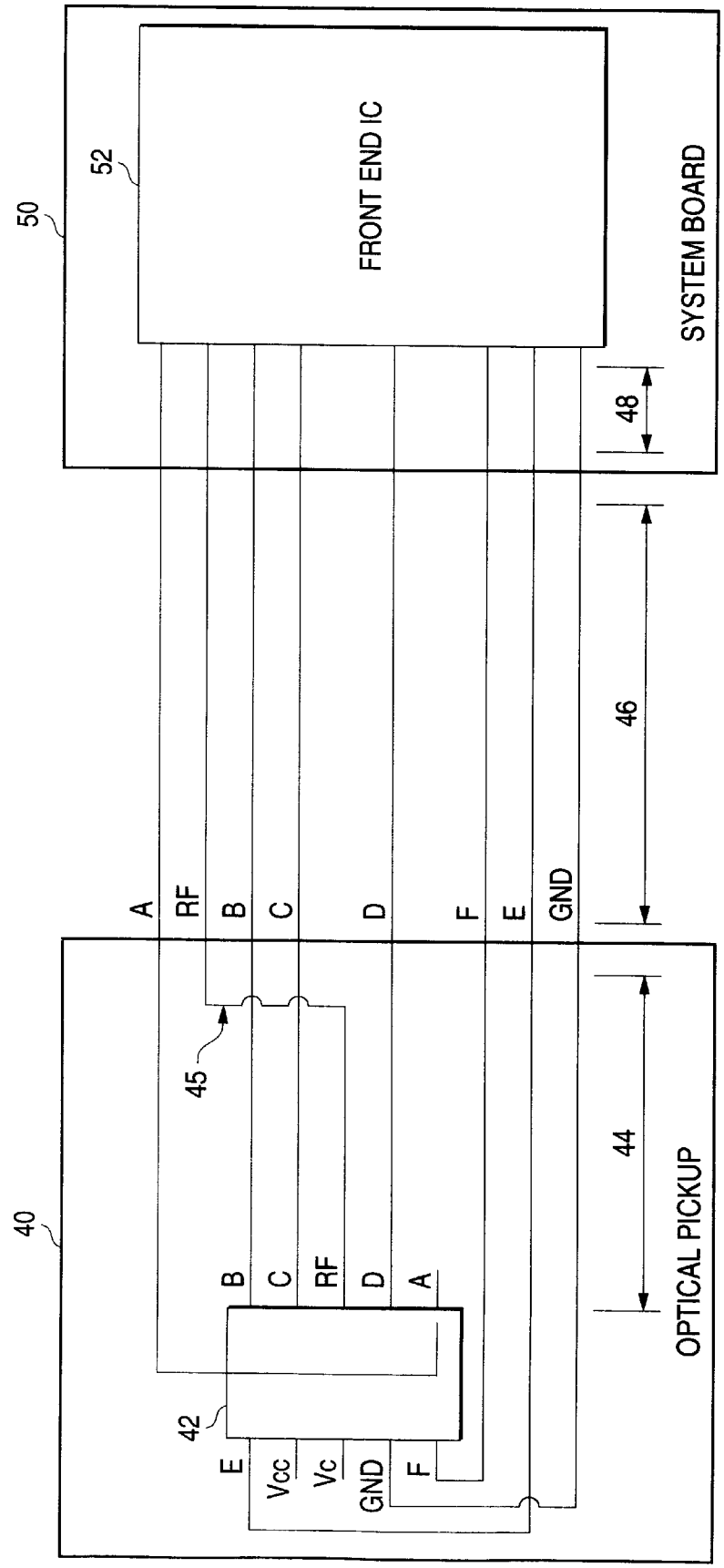
FIG. 5 is a wiring diagram illustrating a related optical data reproduction apparatus.

It is also not necessarily restrictive to arrange one set of terminals or wiring patterns A and C and another set of terminals or wiring patterns B and D in one plane but they may be disposed three-dimensionally. FIG. 4 shows this example wherein wiring patterns A and C are disposed on one face side of a board 30 such as a flexible printed board, and wiring patterns B and D are disposed on the other. Preferably, the board 30 has a conductor as a base, which is coated with an insulating agent, and the wiring patterns A and C and the wiring patterns B and D may be disposed as stated above. In this case, a signal different in nature from the output of a quadrifid light-receiving cell; for example, a signal having a low impedance or what is different in a frequency band such as a power supply line, GND or the like may be passed through the conductor. In so doing, the crosstalk between the wiring patterns A and C and the wiring patterns B and D. Another wiring pattern in addition to the wiring patterns A and C and the wiring patterns B and D may also be disposed on both side faces of the board 30.

Further, the main area or most of the area of the wiring pattern 16 used to connect the wiring pattern 14 in the optical pickup 10 and the wiring pattern 18 on the side of the system board 20 may be so formed as stated above. In other words, the intended effect is achievable unless all the patterns are so formed as stated above. Moreover, each terminal may be or may not be provided with a terminal pin.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. An optical data reproduction apparatus comprising:
   a light-receiving element for optically reading out data on a recording medium, the light receiving element on which a first pair of light-receiving cells and a second pair of light-receiving cells are diagonally arranged to constitute a quadrifid light-receiving cells;
   a pair of first wiring patterns respectively connected to the first pair of light-receiving cells for leading out output signals therefrom to form a first added signal in which the output signals are added;
   a pair of second wiring patterns respectively connected to the second pair of light-receiving cells for leading out output signals therefrom to form a second added signal in which the output signals are added, the first and second added signals used for forming a tracking error signal which indicates tracking error of the optical data reading; and
   a third wiring pattern arranged between the first and second wiring patterns, in which a signal having a different nature from those of the output signals from the light-receiving cells.

2. The optical data reproduction apparatus as set forth in claim 1, wherein the first wiring patterns are arranged adjacent to each other, and the second wiring patterns are arranged adjacent to each other.

3. The optical data reproduction apparatus as set forth in claim 2, further comprising a comparator for comparing phases of the first added signal and the second added signal to form the tracking error signal.

4. The optical data reproduction apparatus as set forth in claim 1, wherein the light-receiving element includes connector terminals through which the respective light-receiving cells and a flexible circuit board are electrically connected;
   wherein the connector terminals includes a pair of first terminals respectively connected to the first wiring patterns and arranged adjacent to each other, a pair of second terminals respectively connected to the second wiring patterns and arranged adjacent to each other, and a third terminal through which a signal having a different nature from those of the output signals from the light-receiving cells passes.

5. The optical data reproduction apparatus as set forth in claim 1, wherein the third wiring pattern is at least one of a power supply line, a ground line, a line having low impedance, a line through which signal having a different frequency band from the output signals from the light-receiving cells passes, and a line connected to a light-receiving cell other than the quadrifid light-receiving cells.

6. The optical data reproduction apparatus as set forth in claim 5, further comprising a comparator for comparing phases of a first added signal and a second added signal to form a tracking error signal;
   wherein the first added signal is formed by adding the output signals from the first pair of light-receiving cells, and the second added signal is formed by adding the output signals from the second pair of light receiving cells.

7. The optical data reproduction apparatus as set forth in claim 6, wherein the light receiving element is disposed in an optical pickup device and the comparator is disposed in a control board of the optical data reproduction apparatus; and wherein the light-receiving element and the control board are connected by a flexible circuit board.

8. The optical data reproduction apparatus as set forth in claim 7, wherein the light-receiving element includes connector terminals through which the respective light-receiving cells and the flexible circuit board are electrically connected;

wherein the connector terminals includes a pair of first terminals respectively connected to the first wiring patterns, a pair of second terminals respectively connected to the second wiring patterns, and a third terminal through which a signal having a different nature from those of the output signals from the light-receiving cells passes.

9. The optical data reproduction apparatus as set forth in claim 7, wherein the optical pickup device includes connector terminals through which the respective light-receiving cells and the flexible circuit board are electrically connected;

wherein the connector terminals includes a pair of first terminals respectively connected to the first wiring patterns, a pair of second terminals respectively connected to the second wiring patterns, and a third terminal through which a signal for preventing from occurring crosstalks when the tracking error signal is formed.

10. The optical data reproduction apparatus as set forth in claim 9, wherein the third terminal is connected to either the power supply line or the ground line.

11. The optical data reproduction apparatus as set forth in claim 9, wherein the light-receiving element is disposed in a wiring board mounted on the optical pickup device; and wherein the third terminal is connected to either the power supply line or the ground line in the wiring board.

12. The optical data reproduction apparatus as set forth in claim 11, wherein the connector terminals are lined up on the wiring board.

13. An optical data reproduction apparatus comprising: a light-receiving element on which a first pair of light-receiving cells and a second pair of light-receiving cells are diagonally arranged to constitute a quadrifid light-receiving cells;

a pair of first wiring patterns respectively connected to the first pair of light-receiving cells for leading out output signals therefrom, the first wiring patterns arranged on one surface of a circuit board; and a pair of second wiring patterns respectively connected to the second pair of light-receiving cells for leading out output signals therefrom, the second wiring patterns arranged on the other surface of a circuit board.

* * * * *

UNITED STATES PATENT AND TRADEMARK OFFICE
CERTIFICATE OF CORRECTION

PATENT NO.        : 6,304,530 B1
APPLICATION NO.   : 09/588610
DATED             : October 16, 2001
INVENTOR(S)       : Hiroshi Kitahara Page 1 of 1

It is certified that error appears in the above-identified patent and that said Letters Patent is hereby corrected as shown below:

Claim 1

Original text (col 8, lines 23-25): "…in which a signal having a different nature from those of the output signals from the light-receiving cells."

Proposed replacement text: "--…in which a signal having a different nature from those of the output signals from the light-receiving cells passes.--"

Claim 9

Original text (col 9, lines 27-30): "…a third terminal through which a signal for preventing from occurring crosstalks when the tracking error signal is formed."

Proposed replacement text: "--…a third terminal through which a signal for preventing crosstalks from occurring when the tracking signal is formed passes.--"

Signed and Sealed this
Eleventh Day of September, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 6,304,530 B1 | Page 1 of 1 |
| APPLICATION NO. | : 09/588610 | |
| DATED | : October 16, 2001 | |
| INVENTOR(S) | : Hiroshi Kitahara | |

It is certified that error appears in the above-identified patent and that said Letters Patent is hereby corrected as shown below:

Claim 1

Original text (col 8, lines 23-25): "...in which a signal having a different nature from those of the output signals from the light-receiving cells."

Proposed replacement text: "--...in which a signal having a different nature from those of the output signals from the light-receiving cells passes.--"

Claim 9

Original text (col 9, lines 27-30): "...a third terminal through which a signal for preventing from occurring crosstalks when the tracking error signal is formed."

Proposed replacement text: "--...and a third terminal through which a signal for preventing crosstalks from occurring when the tracking error signal is formed passes.--"

This certificate supersedes the Certificate of Correction issued September 11, 2012.

Signed and Sealed this
Twenty-ninth Day of January, 2013

David J. Kappos
*Director of the United States Patent and Trademark Office*